US006505176B2

(12) United States Patent
DeFrancesco, Jr. et al.

(10) Patent No.: US 6,505,176 B2
(45) Date of Patent: *Jan. 7, 2003

(54) WORKFLOW MANAGEMENT SYSTEM FOR AN AUTOMATED CREDIT APPLICATION SYSTEM

(75) Inventors: James R. DeFrancesco, Jr., Columbia, MD (US); Amy Fingerhuth, Ellicott City, MD (US); Scott Freiman, Potomac, MD (US); Geoffrey Rusk, Laurel, MD (US); Steven Terpening, Bethesda, MD (US)

(73) Assignee: First American Credit Management Solutions, Inc., Annapolis Junction, MD (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 49 days.

(21) Appl. No.: 09/097,148

(22) Filed: Jun. 12, 1998

(65) Prior Publication Data

US 2001/0014877 A1 Aug. 16, 2001

(51) Int. Cl.[7] .............................................. G06F 17/00
(52) U.S. Cl. ........................................................ 705/38
(58) Field of Search ................................ 705/38, 35, 4, 705/8, 9, 11, 7, 40, 16, 17, 39; 707/10 A

(56) References Cited

U.S. PATENT DOCUMENTS

| | | | |
|---|---|---|---|
| 3,970,992 A | | 7/1976 | Boothroyd et al. ....... 340/172.5 |
| 4,017,835 A | | 4/1977 | Randolph ............... 340/152 R |
| 4,491,725 A | | 1/1985 | Pritchard ..................... 235/375 |
| 4,517,412 A | * | 5/1985 | Newkirk et al. .......... 179/7.1 R |
| 4,598,367 A | | 7/1986 | DeFrancesco et al. ...... 364/408 |

(List continued on next page.)

FOREIGN PATENT DOCUMENTS

| | | | | |
|---|---|---|---|---|
| EP | 0 774 725 A | * | 5/1997 | ........... G06F/17/60 |
| JP | 5-101250 | | 4/1993 | ............ G07D/7/00 |
| JP | 410097668 A | * | 4/1998 | |

OTHER PUBLICATIONS

Derwent–Acc–No: 2001–581055; Natsuno, T, Mar. 2001.*
"Barnett arm links with auto dealers," *Bank Systems & Technology*, vol. 34, No. 4, p. 14 (Apr. 1997). (Printed from Dialog file 268:Banking Information Source).

(List continued on next page.)

*Primary Examiner*—James P. Trammell
*Assistant Examiner*—Pierre Elisca
(74) *Attorney, Agent, or Firm*—Sterne, Kessler, Goldstein & Fox P.L.L.C.

(57) ABSTRACT

A workflow management system for an automated credit application processing system. The workflow management system automatically coordinates the workflow among various workgroups and entities involved in the credit application process. The steps and rule tests that define an organization's workflow are customized according to the workflow requirements and process steps for each organization. The workflow manager allows application steps to be processed simultaneously by various entities involved in the loan application process. Workgroups are defined for each preconfigured workflow definition. Each workgroup is associated with a particular set of functions. A workgroup queue is provided for each workgroup. Workgroup queues contain active or pending steps associated with the workgroup. In operation, users can obtain status information by viewing data from the various workgroup queues. A relational database management system is used to link a plurality of tests with each workflow process step that is defined for particular workflow. The tests are linked to rule elements which are linked to database elements that are linked to functions that alter the database elements. Accordingly, when a function is executed, the workflow management system automatically determines which particular workflow process steps are potentially affected by the executed function. Then, the workflow management system evaluates those steps to determine their status and to further determine the process steps to be activated next.

25 Claims, 10 Drawing Sheets

U.S. PATENT DOCUMENTS

| | | | |
|---|---|---|---|
| 4,600,828 A | 7/1986 | Nogami et al. | 235/379 |
| 4,642,768 A | 2/1987 | Roberts | 364/408 |
| 4,646,250 A | 2/1987 | Childress | 364/518 |
| 4,648,037 A | 3/1987 | Valentino | 364/408 |
| 4,649,832 A | 3/1987 | Hain et al. | 109/24.1 |
| 4,675,815 A | 6/1987 | Kuroki et al. | 379/37 |
| 4,683,536 A | 7/1987 | Yamamoto | 364/408 |
| 4,722,055 A | 1/1988 | Roberts | 364/408 |
| 4,730,252 A | 3/1988 | Bradshaw | 364/403 |
| 4,736,294 A * | 4/1988 | Gill et al. | 364/408 |
| 4,752,877 A | 6/1988 | Roberts et al. | 364/408 |
| 4,774,664 A | 9/1988 | Campbell et al. | 364/408 |
| 4,890,228 A | 12/1989 | Longfield | 364/408 |
| 4,914,587 A | 4/1990 | Clouse | 364/408 |
| 4,947,028 A | 8/1990 | Gorog | 235/381 |
| 4,958,368 A | 9/1990 | Parker | 379/91 |
| 4,965,821 A | 10/1990 | Bishop et al. | 379/91 |
| 4,992,939 A | 2/1991 | Tyler | 364/401 |
| 5,023,904 A | 6/1991 | Kaplan et al. | 379/91 |
| 5,025,138 A | 6/1991 | Cuervo | 235/379 |
| 5,025,373 A | 6/1991 | Keyser, Jr. et al. | 364/408 |
| 5,049,862 A | 9/1991 | Dao et al. | 340/706 |
| 5,083,270 A | 1/1992 | Gross et al. | 364/408 |
| 5,120,906 A | 6/1992 | Protheroe et al. | 178/18 |
| 5,126,936 A | 6/1992 | Champion et al. | 364/408 |
| 5,198,642 A | 3/1993 | Deniger | 235/375 |
| 5,202,825 A | 4/1993 | Miller et al. | 364/405 |
| 5,202,826 A | 4/1993 | McCarthy | 364/405 |
| 5,206,803 A | 4/1993 | Vitagliano et al. | 364/408 |
| 5,212,789 A | 5/1993 | Rago | 395/600 |
| 5,218,539 A | 6/1993 | Elphick et al. | 364/419 |
| 5,220,501 A | 6/1993 | Lawlor et al. | 364/408 |
| 5,231,571 A | 7/1993 | D'Agostino | 364/408 |
| 5,239,462 A * | 8/1993 | Jones et al. | 364/408 |
| 5,241,620 A | 8/1993 | Ruggiero | 395/22 |
| 5,262,941 A | 11/1993 | Saladin et al. | 364/408 |
| 5,274,547 A | 12/1993 | Zoffel et al. | 364/408 |
| 5,287,268 A | 2/1994 | McCarthy | 364/405 |
| 5,297,202 A | 3/1994 | Kapp et al. | 380/9 |
| 5,301,320 A * | 4/1994 | McAtee et al. | 395/650 |
| 5,361,201 A | 11/1994 | Jost et al. | 364/401 |
| 5,369,570 A * | 11/1994 | Parad | |
| 5,383,113 A | 1/1995 | Kight et al. | 364/401 |
| 5,537,315 A | 7/1996 | Mitcham | 364/408 |
| 5,559,895 A | 9/1996 | Lee et al. | 382/119 |
| 5,576,951 A | 11/1996 | Lockwood | 395/227 |
| 5,604,341 A | 2/1997 | Grossi et al. | 235/379 |
| 5,611,052 A * | 3/1997 | Dykstra et al. | 705/38 |
| 5,627,978 A | 5/1997 | Altom et al. | 395/330 |
| 5,699,527 A | 12/1997 | Davidson | 395/238 |
| 5,734,837 A * | 3/1998 | Flores et al. | 395/207 |
| 5,774,882 A | 6/1998 | Keen et al. | 705/38 |
| 5,797,133 A | 8/1998 | Jones et al. | 705/38 |
| 5,870,721 A * | 2/1999 | Norris | 705/38 |
| 5,878,403 A * | 3/1999 | DeFranscesco et al. | 705/38 |
| 5,893,128 A * | 4/1999 | Nauckhoff | 707/511 |
| 5,930,776 A | 7/1999 | Dykstra et al. | 705/38 |
| 5,940,811 A | 8/1999 | Norris | 705/38 |
| 5,940,812 A * | 8/1999 | Tengel et al. | 705/38 |
| 5,940,829 A * | 8/1999 | Tsuiki et al. | 707/10 |
| 5,950,169 A * | 9/1999 | Borghesi et al. | 705/4 |
| 5,960,404 A * | 9/1999 | Chaar et al. | 705/8 |
| 5,966,699 A | 10/1999 | Zandi | 705/38 |
| 5,974,392 A * | 10/1999 | Endo | 705/8 |
| 6,105,007 A | 8/2000 | Norris | 705/38 |

OTHER PUBLICATIONS

Eckerson, W., "Network automates auto loan application process; Speeds Loan Oks, helps buyers find best rates," *Network World,* Networld World, Inc., 2 pages (Mar. 6, 1998). (Printed from Lexis–Nexis).

Berzof, Ken, "Kiosk Issues Bank Cards for Those Dashing Through Dough," *The Courier–Journal,* vol. 269, No. 155, p. 12, Dec. 2, 1989.

*Capstone Decision Manager: Application Decision Management,* HNC Software, 28 pages, Publication date unknown. (Missing Pages 8, 12, 22 and 28).

"Car loans in minutes," *Bank Management,* Bank Administration Institute, vol. 69, No. 4, Apr. 1993, p. A23.

E–mail Message from Michael J. McEnvoy, Tower Group, to Dennis Warnke, CMSINC, Nov. 5, 1998, 3 pages.

Evans, Steve, "No Longer Processing Just Plastic," *SNLSecurities,* Jan. 2000, pp. 39–40.

Lawrence, Jeannette, "(Part 1 of 3) Untangling Neural Nets (When is one model better than another?)," *Dr. Dobbs Journal,* Miller Freeman Inc., Apr. 1990, 3 pages, printed from Internet (http address unclear).

Marjanovic, Steven, "Investors Shrink as Fair, Isaac Grows," 1 page, Publication date and source unknown.

*Product Description: StrategyWare® Version 1.2,* Fair, Isaac and Company, Incorporated, 1998, 60 pages. (Missing pp. 44 & 48).

*RiskWise Products and Services,* 2 page brochure, Publication date and source unknow.

*RiskWise Technology Overview,* 4 page brochure, Publication date and source unknown.

"Atlanta–based Coin Banking Systems signs alliance with NCR for credit authorization solution," Business Wire, Business Wire, Inc., Apr. 3, 1991.

Jason, Rich, "Software;for loan processing;column," Mortgage Banking, Mortgage Association of America, vol. 50, No. 11, Aug. 1990.

Joe Kolman, "Ten Technologies Ahead of the Curve," Institutional Investor, vol. 24, No. 16, pp. 123–124, Dec. 1990.

"Application Processing for Credit Programs," The Magazine of Bank Management, Bank Administrative Institute, p. 75, Nov. 1988.

Bill Atkinson, "Columbia Firm Helps Banks Ring Up Loans on Telephones," Baltimore Business Journal, Baltimore Business Publications, Inc., vol. 6, No. 19, Sec. 2, p. 7B, Oct. 17, 1988.

Patrick Havernson, A man with Grand Visions, Banking Technology, pp. 30–32, dated May 1993.

Richard Read, Crossing the Track to Success, Euromoney, p. 177–180, Jun. 1988.

Anonymous, MortgageWare Resource guide, Interlinq Software Corp, Nov. 1992 (best available copy).

David O. Tyson, Interlinq Mortgage Software Hits Big Time with Prudential Real Estate Subsidiary Deal, American Banker, p. 12, Nov. 18, 1987.

Harry S. Worthmann, "Re–Engineering Update: Where Banks are Going to Fit Along the Information Highway," American Banker, p. 7, vol. 159, No. 98, May 23, 1994.

Conroy, Bill, "Citicorp test–markets device that simplifies home banking," The Business Journal, p. 16, Oct. 29, 1990.

Day, Kathleen, "Cutting Corners at the Kiosk: New service Widen Use of Electronic Devices," The Washington Post, Jul. 22, 1994, p. A1.

Fortunato, Laura, "Loan Lending Magic," Winter 1996/97, vol. 13, No. 4, pp. 12–15.

Jost, Allen, "Neural Networks: A logical progression in credit and marketing decision systems," Credit World, International Credit Association, Mar./Apr. 1993, pp. 26–33.

Kantrow, Yvette D., "Electronic Network Will Link Car Dealers to Many Lenders: Goal is to Create a Form of EFT Transfer System," American Banker Weekly Review, Feb. 8, 1988, pp. 5 & 10.

Karson, Daniel, "Tactical Field Strategies to Trace and Recover Assets in the United States," A practical Guide to Asset Tracing and Recovery: Sure–Fire Strategies to turn hollow judgements into Litigation Victories, The Canadian Institute, Section VII, p. 1–22, Apr. 3 & 4, 1997.

McCall, William, "Microsoft, Banks Team Up to Provide Home Banking," Associated Press, Aug. 3, 1994.

Radding, Alan, "A View of Technology in '92," Bank Management, Bank Administration Institute, pp. 28–35, Jan. 1992.

Sugawara, Sandra, "Stocking Up at the ATM: Citibank Machines to Allow Customers to Trade Shares," The Washington Post, Oct. 6, 1994, p. D11.

Thornton, Emily, "Going Belly–Up in Japan: Bankruptcies are soaring as consumers binge on borrowing," Business Week, The McGraw–Hill Companies, Inc., p. 54, May 5, 1997.

Wilmsen, Steven, "Home–banking service adding Denver to financial network," The Denver Post, p. A–2, Jun. 8, 1989.

"New Paradigms in Retail Banking: The RDS Report on the Future of Retail Banking Delivery," Bank Administrative Institute, 88 Pages, 1994.

Barchard, David, "Cautious mortgage lenders redo their sums," Financial Times, Weekend Jun. 20/Jun. 21, 1992.

Fix, Janet L., "Shopping list: Car loan, canned corn," USA Today, Jul. 20, 1994, p. 68.

"Interactive Banking Gets a Push Up North," Bank Systems and Technology, Miller Freeman, Inc., Mar. 1994, p. 6.

Rothfeder, Jeffrey, "Electronic Bill–Paying for the Little Guy," Business Week, McGraw–Hill, Sep. 25, 1989.

Tauhert, Christy, "Commerce Branches off into PC Banking," Bank Systems and Technology, Miller Freeman, vol. 33, No. 4, p. 34–35, Apr. 1996.

* cited by examiner

WORKFLOW OVERVIEW

PROGRAM FLOW: NOTICE BLOCK (i API/FUNCTION, i-o ProcessList

PROGRAM FLOW: SYNC BLOCK (i-o ProcessList)

PROGRAM FLOW: INITIALIZESTEP BLOCK (i ThisStep, i-9 ProcessList)

WORKFLOW MANAGEMENT SYSTEM FOR AN AUTOMATED CREDIT APPLICATION SYSTEM

BACKGROUND OF THE INVENTION

1. Field of the Invention

The present invention relates generally to an Automated Credit Application System and more particularly to a workflow management system for an Automated Credit Application System.

2. Related Art

Processing loan and credit applications is a complicated process involving numerous tasks that must be completed in a particular order by banks and other lending institutions. Such tasks include filling out a loan application, verifying financial and employment information, checking credit reports from one or more credit bureaus, verifying collateral, making the loan decision and administrating the loan.

These tasks are generally performed by multiple groups within a lending organization. For example, loan officers typically work with applicants to complete the credit application. An underwriter or underwriter group decides whether to issue or "book" the loan based on information from the credit application, current business guidelines, and information from outside agencies, such as credit bureaus and the like. An administrative group distributes payment coupons, receives loan payments and handles other administrative tasks during the life of the loan.

Generally, each task involves many steps which are conventionally performed manually by various people and organizations within the lending institution. The necessary participation between various work groups makes it difficult to manage the complicated process of preparing credit applications in an efficient manner.

Recently, a new tool has become available to financial institutions that alleviates many of the problems brought about using conventional manual loan processing techniques. These automated credit application systems automate many of the tasks that have conventionally been performed manually.

One such example of an automated credit application system is CreditRevue® by CMSI of Columbia Maryland. CreditRevue automates the loan application process from the inception of the loan application to loan administration. All data is gathered and handled electronically throughout the entire lending process according to unique requirements of each lending institution.

For example, CreditRevue provides loan officers with an on-line credit application that is customized for each lending institution according to their specific requirements. Once a credit application has been entered into the automated system, CreditRevue typically communicates with one or more credit bureaus to retrieve credit reports on behalf of the loan applicant.

CreditRevue can then make a credit decision based on scoring rules and other criteria as required by the lending institution. For example, automated credit decisions can be generated using a combination of advanced credit bureau analysis, multiple scoring models and judgmental review. The automated system can also monitor lending policy guidelines to ensure compliance from both a regulatory and managerial standpoint.

In addition, CreditRevue can assist in loan administration and prepare loans for booking by verifying documents and contract details. The system can also automate the transfer of a booked application to the lending institution's servicing system.

As stated, each lending institution generally has unique requirements for processing loans. For example, decision making rules are generally different among lending institutions. Workgroups and workgroup responsibilities are unique for each lending institution. Steps used to process loan applications and the order in which these steps are processed vary widely among lending institutions. Many of these parameters are also subject to change within single lending institution.

Because of the unique and dynamic nature of loan processing requirements, it is very difficult to provide an automated credit application system that will satisfy the needs of multiple lending institutions. Accordingly, providers of such systems must customize their software in order to comply with the unique requirements of their clients. Customization typically involves changing and adding source code modules to the base automated credit application system, This causes a significant increase in cycle time for development and testing. Clearly this customization is extremely costly for both the system providers, the lending institutions and ultimately, the consumer.

Workflow management is one area of automation that is subject to much customization. In general, workflow management defines and manages the credit processing steps that are needed to complete a credit application. This includes identifying individuals and/or workgroups that are responsible for completing each step in the credit application process.

Generally, workflow requirements vary widely among lending institutions. For example, one organization may require that an underwriting group or individual make final loan decisions based on information reported by the automated system. Another organization may desire to allow the automated system to approve loans based on automated analysis of predetermined criteria.

In another example, it may be desired to automate the loan approval process but also allow certain exceptions to be made by authorized workgroups or individuals. In this example, certain items that would otherwise cause a loan to be rejected can be waived by one or more authorized individuals or work groups.

As stated, providers of automated credit application systems customize their software according to the unique workflow requirements of each lending institution. Conventionally, workflow management is hard-coded according to the needs of each lending institution. For example, CreditReveu uses named stations to implement the workflow management system. Each named station is associated with one or more physical workstations that are connected to the automated credit application system. As the workflow progresses, outstanding process steps are processed only at the named stations associated with the particular process step.

Using this conventional method, users are forced to go to one of these named stations to access the credit application and to perform functions thereon to complete the credit application. In this fashion, credit applications are transferred from one named station to the next, depending on which steps are to be completed next.

For example, during application entry, the credit application is only accessible at the workstations associated with one or more loan officers. Similarly, during the underwriting stage, the credit application is only accessible at the workstations in the underwriting group.

Generally, in order to move the application along, users are forced to manually complete the outstanding steps at the associated named station. Once the step or steps are complete, users manually transfer the application to the next named station according to the customized preprogrammed workflow. Using the conventional method, the workflow is isolated in this fashion, and the processing of credit applications is performed in a serial manner that cannot be altered without having to re-customize the automated credit application system's source code.

Therefore what is needed is a workflow management system that provides additional flexibility so that the workflow is not restricted to serial processing using preprogrammed named stations. In addition what is needed is a workflow management system that can be customized according to requirements of lending institutions without having to customize the source code each time the workflow requirements change.

SUMMARY OF THE INVENTION

Accordingly, the present invention is directed toward a workflow management system for an automated credit application system that is flexible and can be easily customized according to individual requirements of financial institutions. The steps and rule tests that define an organization's workflow are customized according to workflow requirements and process steps for each organization. This is accomplished using the present invention without having to develop and change the source code associated with the automated credit application system. In particular, a workflow configuration tool is used at run-time to define customized workflow requirements. This alleviates that need to customize source code for each client and each time workflow requirements change.

The workflow management system of the present invention automatically manages the workflow and allows for application steps to be processed in a parallel fashion, rather than the serial method found in conventional systems. Workgroups are defined for each pre-configured workflow definition of the present invention. Each workgroup is associated with a particular set of functions that the workgroup has responsibility for. In addition, each workgroup has a workgroup queue associated with it. Workgroup queues contain all of the active steps associated with the workgroup. Active steps are workflow process steps that are currently pending and ready to be processed. Each workflow queue is automatically updated as soon as prerequisite steps are completed according to the customized workflow model.

In this fashion, users in a particular workgroup can for example, view all of the applications which have active steps pending for the workgroup. In another example a user can ask to see all of the pending applications in which a particular step needs to be completed. In addition, users can instantly view progress data related to credit applications being processed. For example, users can determine exactly what stage a credit application is in, and which workgroup or individuals have the responsibility to act next. Still further, users can determine precisely what conditions may be present that are preventing credit applications form progressing to completion.

The workflow management system of the present invention automatically coordinates the workflow among various workgroups and entities involved in the credit application process. The workflow management system of the present invention automatically controls and manages which process steps can be worked on by various workgroups simultaneously.

A relational database management system is used to link a plurality of rule tests with each workflow process step that is defined for particular workflow. Rule elements are linked to tests that are linked to database elements which are linked to functions that alter the database elements. Accordingly, when a function is executed, the workflow management system of the present invention automatically determines which particular workflow process steps are potentially affected by the executed function. Then, the workflow management system of the present invention evaluates those steps to determine their status (i.e. complete, incomplete, etc.), and determines which process steps are next activated.

BRIEF DESCRIPTION OF THE FIGURES

The present invention is described with reference to the accompanying drawings, wherein.

DETAILED DESCRIPTION OF THE PREFERRED EMBODIMENTS

Figure 1:
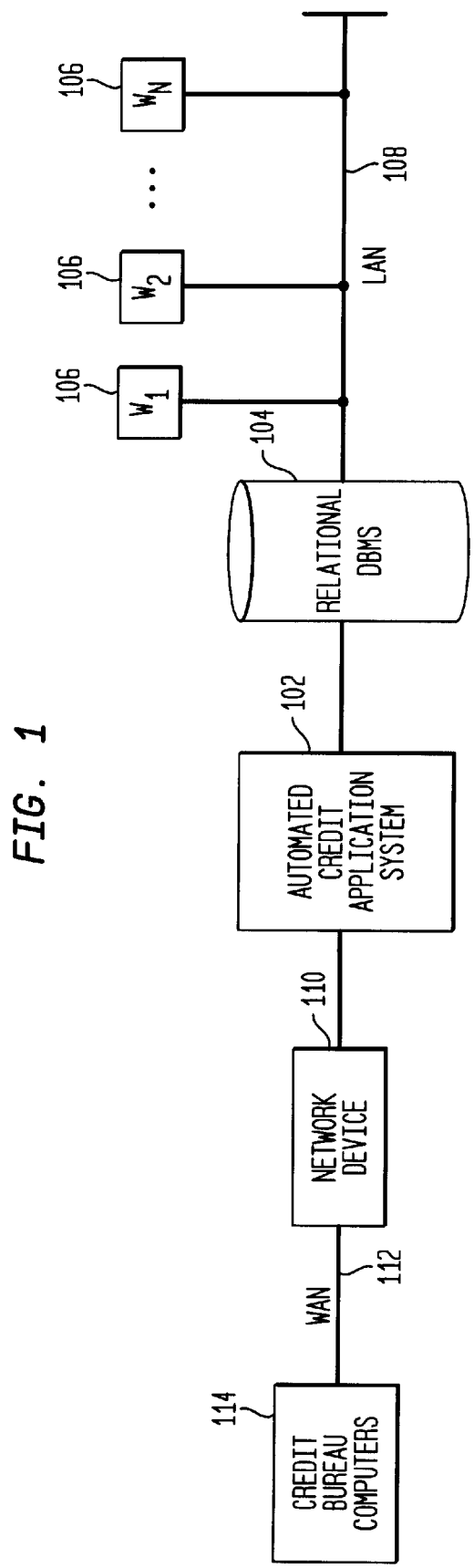
FIG. 1 is a block diagram depicting an operational environment according to a preferred embodiment of the present invention.

FIG. 1 is a block diagram depicting an operational environment according to a preferred embodiment of the present invention. A computer system running an automated credit application system is shown as block 102. The computer system 102 is coupled with a local area network (LAN) 108. The LAN 108 is shown as an example only, and any type of computer network can be used. This includes multiple LANs coupled together with routers, leased telephone lines and/or public or private switched telephone networks to form wide area networks (WANs) and the like. The use of multiple private and public computer networks, such as the Internet, can also be used in alternate embodiments of the present invention. Typically however, the automated credit application system is coupled with one or more LANs, such as the LAN 108, that is typically confined for security purposes, to a geographical location associated with a lending institution. This does not prohibit remote access to the LAN 108, which may also be implemented in various embodiments of the present invention.

A plurality of workstations, W1, W2, . . . WN 106 is coupled with the LAN 108. Generally, these workstations are directly or remotely attached to the LAN 108, and are used to interact with the automated credit application system 102. A database management system (DBMS) 104 is coupled with the LAN 108. The DBMS 104 is used to store data associated with the automated credit application system 102. Preferably, a relational DBMS, such as Progress® DBMS provided by Progress Software Corporation of Bedford Massachusetts is used.

A preferred embodiment of the present is implemented using Progress® 4GL, provided by Progress Software Corporation of Bedford Mass. Progress 4GL is a high-level Forth-Generation development language used to create applications using object-oriented, event-driven and structured programming techniques. The use of Progress 4GL is an example of the preferred method of implementing the automated credit application system of the present invention. Other programming methods and tools can be used to implement alternate embodiments. Such alternate embodiments will be apparent to persons skilled in the relevant art(s), and are therefore within the purview of the claims listed below, which define the scope and breadth of the present invention.

A network device 110 is attached to the LAN 108 in the example operational environment shown in FIG. 1. The network device 110 is used to connect the automated credit application system 102 with remote computers, such as the remote credit bureau computers, as depicted by the block 114.

Figure 2:
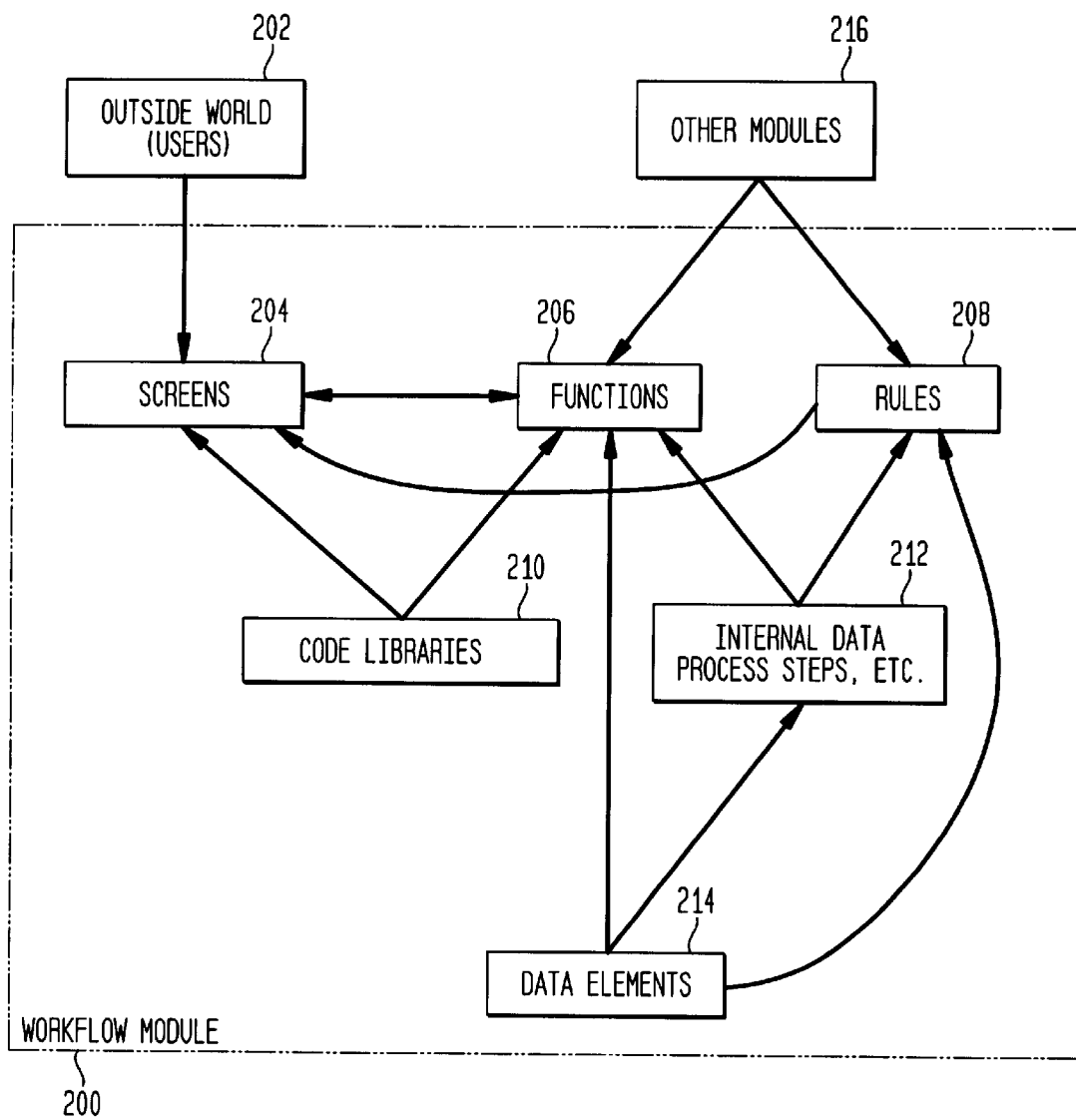
FIG. 2 is a block diagram depicting components of the workflow management module according to a preferred embodiment of the present invention.

FIG. 2 is a block diagram depicting components of the workflow management module according to a preferred embodiment of the present invention. Block 202 represents users that interact with the workflow management component 200 via a user interface or Screen module 204 to perform Functions 206, such as to interact with their workflow queue screen. For example, the application workflow queue screen is stored in the Screen module 204.

Functions 206 can affect data elements 214 stored in the database 104. Examples of functions stored in the function module 206 include the NOTICE and SYNC functions, which are subsequently described below with references to FIGS. 6 and 7, respectively. A Rule module 208 stores tests and derives values for predetermined rule objects based on stored data elements in the database 104. An example of a test stored in the Rules module 208, is a test to determine whether a particular workflow step is complete.

Functions 206 allow users to perform actions. Functions 206 can be securable. That is, each function in the Function module 206 can be associated with a particular level of security so that only authorized personnel having that level of security or above can perform the specified function.

Functions 206 can read and/or write data elements 214 to the database 104, and can affect rule objects in the Rules module 208. Preferably, Functions 206 maintain a list of rule objects that they manipulate. Whenever a user 202 performs a Function 206 that changes one or more data elements 214 in the database 104, at least one rule object in the Rules module 208 is typically modified. In this fashion, an automatic notification feature is provided to the workflow management module 200 so that it can dynamically and efficiently determine the status of workflow process steps (described below).

For example, the automatic notification feature of the present invention allows the workflow management module 200 to dynamically and efficiently determine which workflow process steps are completed, and which steps are to be performed next, in response to functions performed by users. Workflow process steps and their associated attributes are stored in the Internal Data module 212. This feature of the present invention is described in detail below.

The Code Library module 210 is used to store library routines for the Screen module 204 and the Functions module 206. Example of routines stored in the Code Library module 210 include common actions performed on screens, such as a browser function, and maintenance functions providing security for access requests, audit trails and the like. Other modules of the automated credit application system of the present invention that can access the workflow module 200 are represented by block 216.

Figure 3:
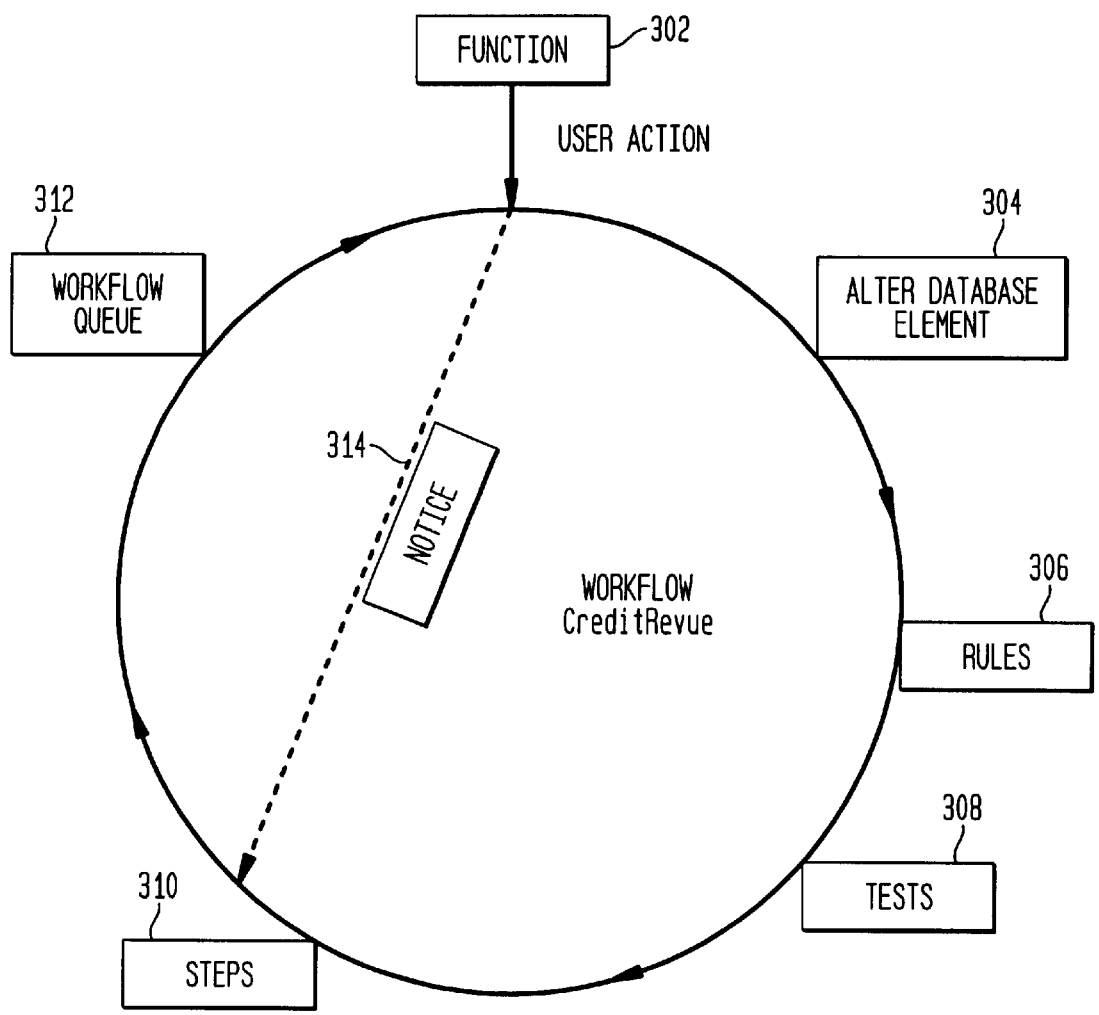
FIG. 3 depicts a functional overview of the workflow management system that is useful for describing the inter-relationships between workflow management elements according to a preferred embodiment of the present invention.

FIG. 3 depicts a functional overview of the workflow management system that is useful for describing the inter-relationships between workflow management elements according to a preferred embodiment of the present invention. Block 302 represents functions 206 performed by users that cause a change to one or more database elements 214 in the database 104. As depicted by block 304, a database element is altered as a result of a database save action from a user. Each function has an associated set of rule elements 208, as depicted by the block 306. More specifically, each database element 214 has one or more rule elements 208 associated with it. A rule element is used to derive information from one or more database elements 214. An example of a rule element is 'Total Income'. Total Income can be a summation of several database elements, including for example, 'primary income', 'secondary income' and 'alternate income'.

Each rule element 306 may be associated with one or more tests 308. Tests are preferably of the BOOLEAN type and are either TRUE or FALSE. An example of a test 308 associated with the Total Income rule element is: 'If Total Income is Greater than $20,000, then the test object is TRUE.' The test object is used for example, to determine if a particular processing step is complete, or can be skipped.

Credit Application process steps are represented by block 310. Steps 310 are tasks that users perform in the lending process that require completion in order to complete the credit application. Steps may be manually performed by users or automatically performed by the credit application system of the present invention. Each step 310 has a specific set of rules 306 associated with it. More specifically, each step 310 is associated with a specific set of tests 308 which are each associated with a specific set of rule elements 306. As stated, each rule element 306 is associated with a database element 304, which is associated with a function 302.

In this fashion, because the association between process steps 310, tests 308, rule elements 306, database elements 304 and functions 302, the workflow management system of the present invention can determine what process steps 310 may be affected whenever a user (or the automated credit application system), performs a specified function 302. This may or may not cause an update to a user or group workflow queue 312 (described below). This feature is referred to herein as an automatic notification feature and is represented by the dotted line 314 between the function block 302 and the steps block 310.

The associations between workflow management elements 310, 308, 306, 304 and 302 are preferably implemented with the use of a relational database management system, such as the relational DBMS 104. Specific methods using database tables, indexes and database management tools, to relate these elements according to the descriptions provided herein, would be apparent to persons skilled in the relevant art(s) and are therefore not described in detail herein.

An example is presented below to further describe the automatic notification feature 314 of the present invention. In this example, a user performs a function 302 to modify employment information. For example, a loan officer inputs an applicant's income into the credit application an saves the information.

When the loan officer saves the information, several database elements 304 are updated. For the purposes of this example, it is assumed that two database elements are updated, namely: 'primary income' and 'secondary income.'

In this example, it is assumed that the associated rule element 306 'total income', is derived from the database elements of primary and secondary income. In this example the rule element 306 is derived as follows: 'Total Income= primary income+secondary income.'

Next, assume that a test 308 associated with the total income rule element was created. This test is referred to herein as "Verify" test. In this example, the Verify test is TRUE if the total income is greater than $20,000. Next, assume that a process step 310 exists that requires the applicant's income to be verified, only if the Verify test is TRUE. If the Verify test is FALSE, the process step is skipped.

Therefore, using the above example, the user action of inputting and saving the applicant's income to the database, causes the Verify test to be evaluated. If the test is TRUE, the process step becomes an active step in the workflow. If the test is FALSE, the process step is skipped. Accordingly, the appropriate workgroup queue(s) 312 are updated to include the process step only if the Verify test is TRUE.

Each workgroup defined in a workflow has an associated workflow queue 312. The workflow queue lists each of the applications that have process steps which are currently active and may be performed by a member of the associated workgroup. Process steps are considered active whenever their associated prerequisite steps have been completed. Generally, users can view the workgroup queue according to customized constraints, such as viewing particular applications that need attention or particular workflow process steps.

It is important to note that the automatic notification feature 314 of the present invention provides for an efficient method to evaluate process steps. In this fashion, only process steps that may be affected by a particular function is evaluated in response to the function. This alleviates the need for the automated credit application system of the present invention to re-evaluate every process step in the workflow every time a function 302 is performed.

In addition, steps that have previously been completed are automatically re-evaluated whenever a function is performed that may affect that step. For example, a user may update information that was previously entered into the credit application. In this instance, it may be required to perform process steps that may have already been performed based on updated information, thus ensuring consistency of workflow throughout the application's life cycle.

As stated, process steps 310 are steps that require completion in order to complete the processing of a credit application. Process steps 310 may be manually completed by users or automatically completed by the automated credit application system. In addition, process steps may require custom routines to be executed in order to determine whether they are complete.

Preferably, the definition of process steps 310, including the order in which they are performed, are specified by a user (or initially by the provider of the automated credit application system), with the use of a workflow configuration tool. The workflow configuration tool is also used to define workflow rule elements 306 and the workflow tests that are associated with the workflow process steps. The workflow configuration tool can be used by the end user (i.e. financial institution), the provider of the automated credit application system, or both, depending on the specific implementation of the present invention. In general the workflow configuration tool is used to create process steps 310 and associated tests 308. Pre-created process steps are then selected to define a workflow for a particular financial institution.

Figure 4:
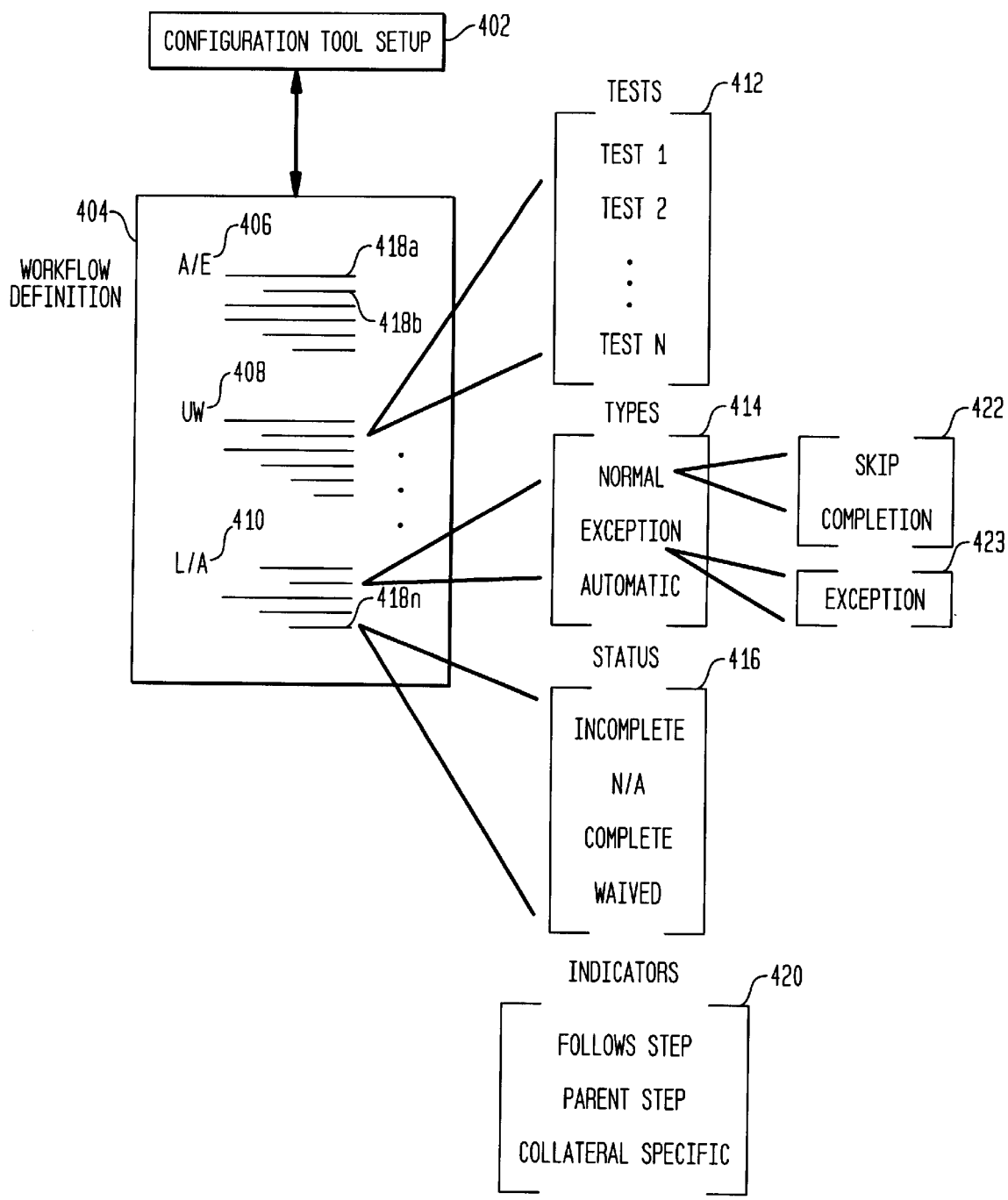
FIG. 4 depicts a block diagram of a workflow definition and a workflow configuration tool according to a preferred embodiment of the present invention.

FIG. 4 depicts a block diagram of a workflow definition and a workflow configuration tool according to a preferred embodiment of the present invention. A workflow configuration tool is depicted by the block 402. In a preferred embodiment, the workflow configuration tool 402 allows users to define and select workflow process steps to build a workflow definition 404. The workflow definition 404 is comprised of a plurality of workflow process steps. In this example, the process steps are depicted as the horizontal lines 418a, 418b . . . 418n (generally 418). The workflow process 418 steps in this example are divided in sections, 406,408 and 410, that represent application entry, underwriting and loan administration, respectively.

In a preferred embodiment, three types of steps 418 can be defined for a workflow 404 as indicated by block 414. The types of steps are normal steps, exception steps, and automatic steps. Steps can also be categorized as manual steps, in which case, user action is required to complete the step, in addition to any associated tests. Generally, a user completes a checklist to indicate that a manual step is complete. Normal steps are individual action items that must occur to a credit application before it is considered complete. Exception steps are used to manage any exceptions encountered in the normal processing of credit applications. Exception steps are typically configured to follow the actual step that causes the exception. Automatic steps are steps that cause the automated credit application system to automatically run a function when the step becomes the next step in an application's workflow.

The automated credit application system of the present invention preferably maintains a library 210 of all unique processing steps in any workflow. To add a new step to a predefined workflow, the configuration tool 402 can select an existing step from this library 210, or can create a new normal, automatic or exception step. When a new step 418 is created for a specific workflow 404, it is also added to the library 210, so that it can be used in other workflow definitions.

Preferably, steps 418 are defined in a particular order that represents the workflow of the application. Although processing steps in their specified order is not always required, the workflow 404 is built by adding steps 418 in their specified order. The workflow configuration tool 402 defines the order in which steps occur. Sometimes steps 418 can occur in any order. For example, the order in which the 'Verify Employment' and the 'Verify Residence' steps occur would be immaterial. One can precede the other and vice-versa. However, there may be instances where a specific step cannot occur until the completion of another step. For example, a step involving loan administration 410 cannot occur until an underwriting step 408 is completed in which the final credit decision is made.

An indicator 420 referred to herein as the 'follows step' indicator is associated with each step 418 to ensure that a step is added to the workflow 404, only after a predecessor step has been completed. This prevents erroneous analysis of steps that are not ready to be processed. In the above example, the follows step indicator for the loan administration step is the final credit decision step. When a workflow 404 is built for an application, steps 418 are added to the workflow 404 according to the follows step indicator.

Steps 418 may be grouped together to form a block of steps. When this is done, the grouping step is referred to herein as the 'parent' and each individual step of the group is referred to as the 'child'. Child steps can also group additional steps, and in doing so, become parents steps themselves.

Accordingly, each step may have a parent and children. A step may also be standalone with no parent or children. Preferably, parents and children are created by indenting child steps from their parent step as presented by the workflow configuration tool 402. A child step has an indicator 420 which identifies the parent step. This parent child relationship is depicted in FIG. 4 as indented horizontal lines that represent steps 418. For example, because 418b is shown as being indented from step 418a, step 418b is a child of step 418a.

In addition, steps 418 can be tagged with a 'collateral-specific' indicator as shown by block 420. This tag indicates that the processing step must be completed separately for each applicable collateral defined in the credit application.

As stated the workflow management system of the present invention uses workflow tests 308 to determine the status of steps have been completed. Preferably status definitions for workflow steps are shown in block 416 as incomplete, non-applicable, complete and waived. A status of complete is associated with steps that have been completed. Steps not completed have a status of incomplete. Steps that are waived are tagged with a waived status flag. Steps that are skipped are tagged with a N/A status flag.

Each workflow step 418 may be associated with one or more tests, as shown by block 412. The workflow management system of the present invention uses tests 412 to build a workflow for an application and to define how a step 418 is processed. The step type 414 determines which tests 412 are needed to ensure the correct processing of the step. It should be recalled that in general, tests use rules which link activity with workflow steps so that when a function is performed, the workflow management system knows which steps may have been affected. Those steps are then evaluated using the associated tests to determine the status 416 of the potentially affected steps 418.

When a user configures a workflow 404, tests 412 are added to each step being defined. Thus, each step 418 has a one or more sets of associated tests 412. As tests are added to steps, the functions that update the values used in the tests are tracked so that when the function is accessed the workflow management system knows which steps require analysis.

Preferably, three types of tests can be defined for workflow steps 418. These types are shown as blocks 422 and 423. As shown, Skip and completion tests 422, preferably apply to step types 414 of normal. Exception tests 423 generally apply to exception step types 414. Skip tests are used to determine the presence of a specified criteria that would cause the associated step 418 to be tagged with a status of N/A as shown by status block 416. Steps 418 having a status 416 of N/A do not apply to the workflow, and are therefore skipped. For example, one step may be to send out a decline letter to the applicant. However, this step should be skipped if the applicant is granted a loan.

A completion test or test set 422 is tested to determine if the associated step is complete. When steps are complete, the next step which has follows step indicator 420 pointing to the completed step, can become active (i.e. ready to be performed). It should be recalled that active steps appear on at least one workflow queue 312. For example, on the 'Enter Contract Information' step, the completion test may be 'Contract date is available.' Accordingly, when the test is evaluated and the workflow management system determines that a contract date is available, the step is marked complete and subsequent steps become active in the workflow.

The following is a list of some of the unique terms used to describe the present invention.

| | |
|---|---|
| Processing Step (or step) | An individual action item that must occur to a credit application during its life cycle. |
| Function | Action or set of actions performed by a user or performed automatically by the present invention that causes data to be written to the database. |
| Tests | Set of instructions that tests or compares values on an application with other values or a predefined parameter and returns either TRUE or FALSE. |
| Completion Tests | Tests that are tested to determine if a step is complete. |
| Exception Tests | Tests that are only applicable for exception steps and act as both skip and completion tests for exception steps. |
| Skip Tests | Tests that are tested to determine if there is a special circumstance that would cause the step to not apply to the workflow and therefore be skipped. |
| Which to Use Tests (Sublines) | Tests that determine which set of skip and completion tests to use. |
| Automatic Step | Special type of step that causes the workflow management system to automatically run a function when the step becomes the next step in the application's workflow. |
| Exception Step | Special type of step used to manage any exceptions encountered in the normal processing of applications. |
| Manual Step | Step on which, regardless of the presence of completion rules, the user must indicate that the step is complete. |
| Next Step | Step to be completed next in an application's workflow. While several steps may be outstanding at any given time, only one step is the next step for any given workgroup. |
| Workgroups | Defined groups that contain one or more users, used to visualize applications to the people who work on them. |

Figure 5:
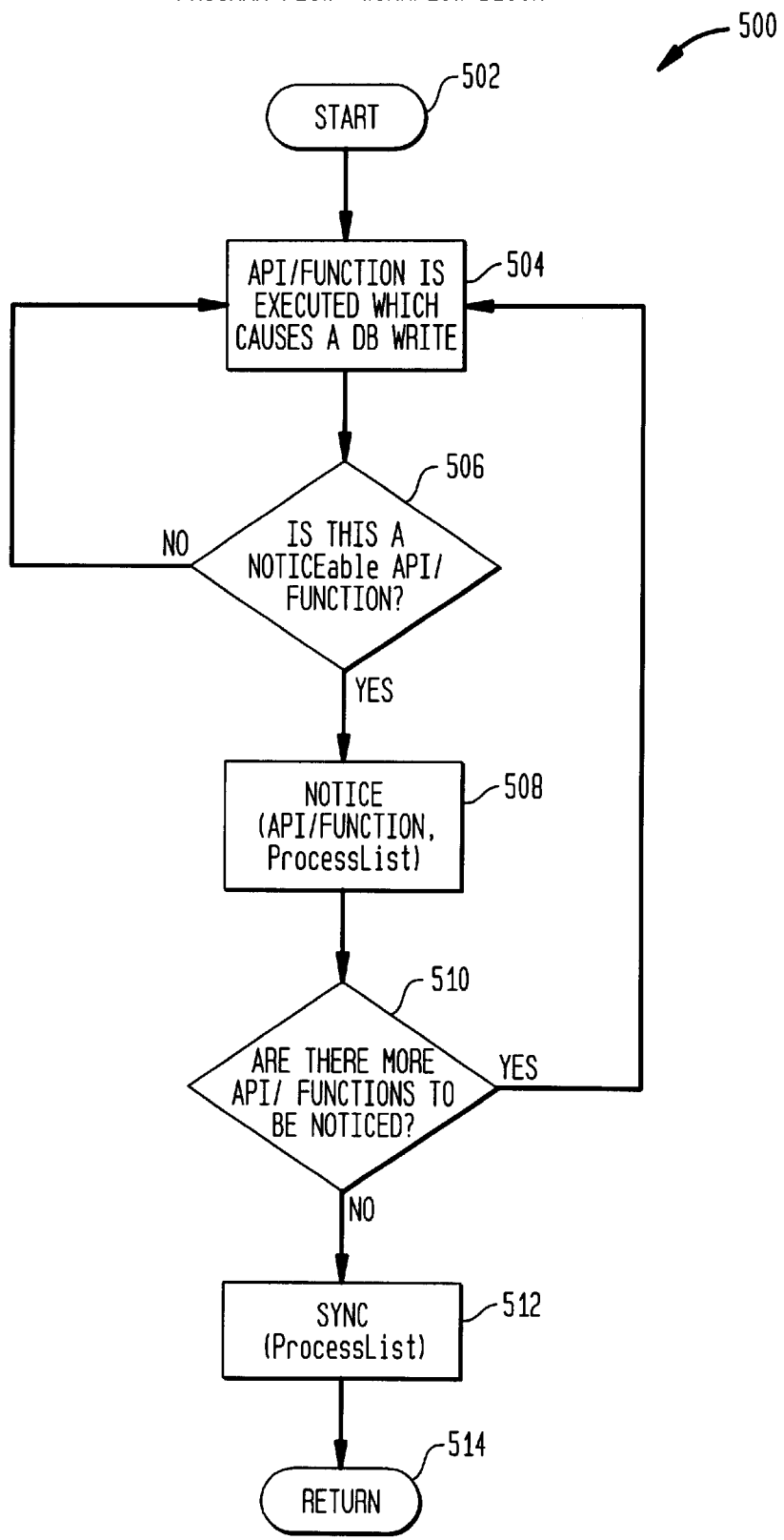
FIGS. 5–9 are flowcharts depicting methods that can be used to implement the workflow management system according to a preferred embodiment of the present invention.

FIGS. 5–9 are flowcharts depicting methods that can be used to implement the workflow management system according to a preferred embodiment of the present invention. The WORKFLOW method 500 is depicted in FIG. 5. The method begins with step 502, where control immediately passes to step 504. In step 504 a function 302 is executed which causes a write to the database 102 (also see block 304). In step 506, the WORKFLOW method 500 determines whether the executed function 302 is a 'Noticeable' function. Noticeable functions are functions that are associated with the evaluation of a credit application and write to the database 104. This is in contrast to other functions that may be performed, such as maintenance functions and the like, which are not relevant to the workflow management system. A function is identified as being Noticeable through the use of a flag (or equivalent) stored in the database table row associated with the function.

As indicated by step 506, if the executed function is not Noticeable, control passes back to step 504, where essentially, the method 500 waits until another function is executed, and step 506 is repeated. If step 506 determines that the function from step 504 is Noticeable, control passes to step 508.

In step 508, another method referred to herein as 'NOTICE' is called. The NOTICE method 508 is used to update a list comprising active process steps 310 that need to be evaluated as a result of Noticeable executed functions.

Active process steps refer to steps that are ready to be executed. Active process steps are steps that appear on at least one workflow queue 312. Evaluating a process step involves determining whether the status of a process step has changed because of the executed function. Tests 308 associated with a process step are used to make this determination. For example, a completion test set is used to determine if a process step has been completed. A skip test set is used to determine if a process step is non-applicable (N/A) or is to be skipped. A exception test set is used to determine if an exception should be made.

The NOTICE method 508 (described in detail below), essentially adds process steps to an internal list maintained by the workflow management system referred to herein as the 'processList'. Accordingly, the internal processList comprises a list of active process steps that need to be evaluated by the workflow management system of the present invention. It should be noted that the processList is an ordered list according to the hierarchy of the process steps. In this fashion, child steps are automatically evaluated before parent steps. This avoids the scenario of evaluating a parent step before a child step, and then having to immediately re-evaluate the parent step a second time, because the child step was just evaluated After the NOTICE method 508 is executed, control passes to step 510. In step 510, the WORKFLOW method 500 determines if any additional functions have been executed. This can be true for example, if one or more additional functions have been executed while the workflow management system was processing step 508. If so, control passes back to step 504, and steps 504–510 are repeated until no additional functions are pending.

Next control passes to step 512. In step 512, another method referred to herein as the SYNC method is called. The SYNC method 512 essentially removes process steps from the processList, after being evaluated. The SYNC method 512 is described in detail below. Next, as step 514 indicates, the WORKFLOW method 500 ends. The WORKFLOW method 500 will be repeated whenever another function is executed.

Figure 6:
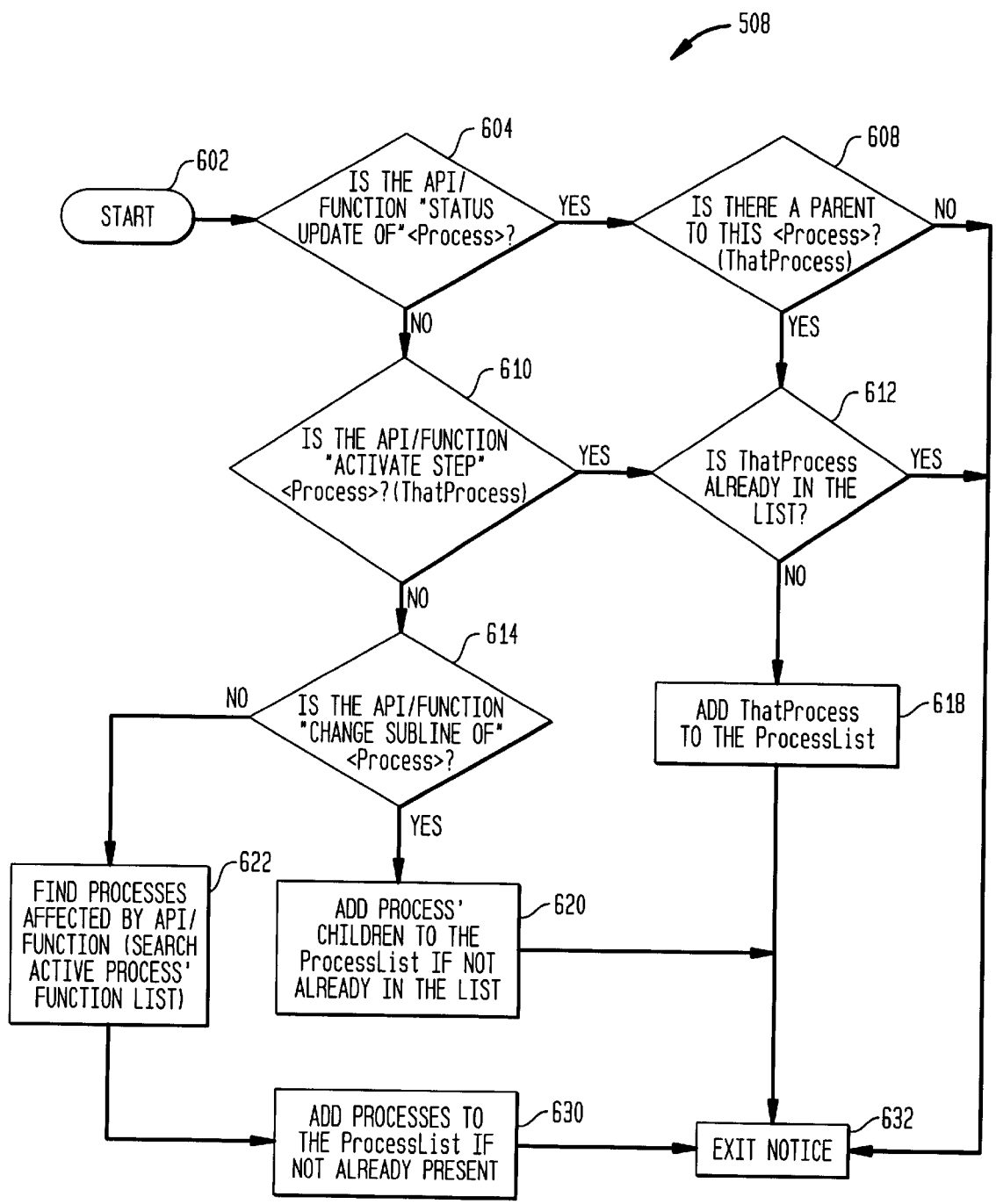

An example of a method that can be used to implement the NOTICE method 508 will now be described with reference to FIG. 6. The NOTICE method 508 begins with step 602, where control immediately passes to step 604. In step 604, the method 508 determines if the noticeable executed function is a 'Status Update' type function. Preferably, function names indicate the type of function. In this example, certain internal functions having the type 'Status Update', 'Activate Step' and 'Change SubLine' are tested in steps 604, 610 and 614, respectively. The meaning of each of these function types are described below.

It should be noted that the three types of internal functions described above, are all executed by the SYNC method 512 (described below). The SYNC method 512 calls the NOTICE method 508 after executing the related internal function (See SYNC method 512, steps 710, 728 and 740). Accordingly, the workflow manager of the present invention NOTICES functions that are executed by itself.

Referring back now to step 604, the NOTICE method 508 determines if the function is of the type 'Status Update'. This indicates that the status 416 of the process step '<process>' was just updated. In this case, the parent step of <process> (referred to as ThatProcess) needs to be re-evaluated. Accordingly, as indicated by step 608, the NOTICE method 508 determines if such a parent process step exists. If a parent process step does not exist, control passes to step 632, where the NOTICE method 508 ends.

If a parent process step does exist, control passes to step 612. In step 612, the method determines if the parent process step is already included in the processList. If it is, then the NOTICE method 508 ends as indicated by step 634. If the parent process step is not already present in the processList, then it is added to the processList in step 618, and the method ends with step 632.

Control passes to step 610, if in step 604 it is determined that the function is not of the type 'Status Update'. In step 610, the method determines if the function is of the type 'Activate Step'. This indicates that a process step (referred to as ThatProcess), has just been activated. If so, control passes to step 612, where the method adds the process step to the processList, if it isn't already present, as indicated by steps 612 and 618. This ensures that as steps are added during the lifecycle of the application, they are always evaluated at least one time. The NOTICE method 508 then ends with step 632.

Control passes to step 614, if the tests from steps 604 and 610 are both negative. In step 614, the method determines if the function is of the type that changes a SubLine of a process step. A SubLine is a classification used to identify a particular set of completion tests, skip tests or exception tests (422 and 423) associated with a process step. It may be desirable at times, to change one or more of these set of tests for a particular step. In this fashion, the same process steps can be used in different workflows, each having different sets of rules or SubLines. Thus, a change SubLine function is provided for this purpose.

As step 614 indicates, if a change SubLine function has been executed for a process step, the child process steps are added to the processList (if not already present), as indicated by step 620. The NOTICE method 508 then ends as indicated by 632.

Control passes to step 622, if the executed function is not of the three types tested in steps 604, 610 and 614. This represents usual processing for most functions that affect the status of a credit application. This is to be contrasted with the three previously mentioned special types of administrative internal functions originating essentially from the SYNC method 512.

In step 622, the NOTICE method 508 finds process steps that may be affected by the function that was just executed. Preferably, this is accomplished by searching function lists associated with each of the current active process steps. An active process step is a step that is currently pending and ready to processed. Specifically, in this example, active process steps have been initialized via the INITIALIZE method, which is called from the SYNC method 512, and is subsequently described below. The effect of active process steps is that they appear in one or more workflow queues 312, which indicates to users that the process step is ready to be processed.

As stated, the NOTICE method 508 finds process steps that need to be evaluated by searching each function list associated with each active process step. Function lists are preferably generated by the present invention before run-time to more efficiently find process steps that may be affected by functions during run-time. Function lists are a list of functions associated with a process step that can potentially affect the status of the process step. These function lists are new lists that are derived from the associations between the process steps 310, tests 308, rule elements 306, database elements 304 and functions 302. The function lists directly link process steps to functions that may affect them.

Next in step 630, the process steps found in step 622 are added to the processList, if they are not already present. The NOTICE method 508 then ends as indicated by step 632.

Figure 7:
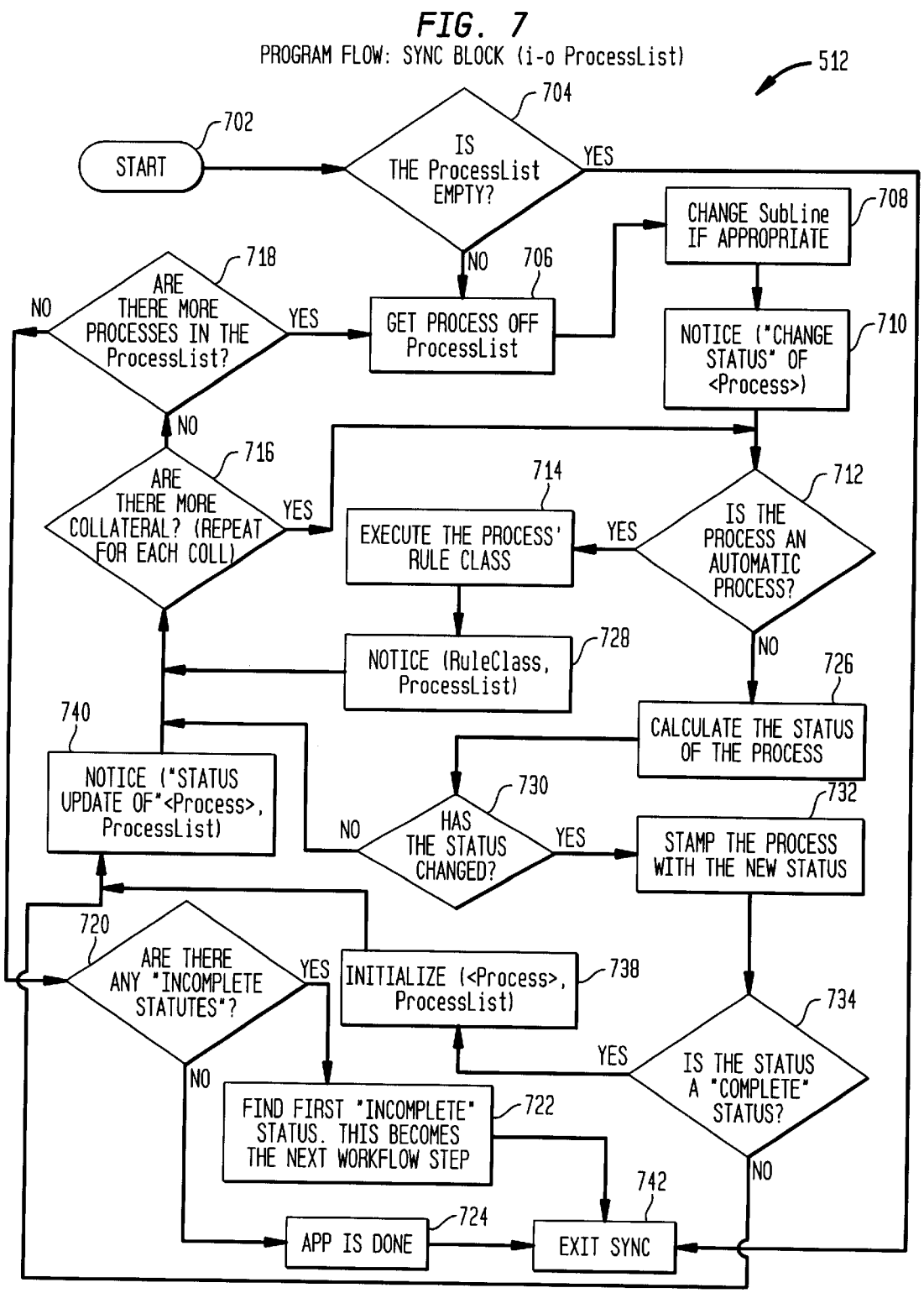

An example of a method that can be used to implement the SYNC method 512 will now be described with reference to FIG. 7. The SYNC method begins with step 702, where control immediately passes to step 704. In step 704, the method determines if the ProcessList is empty, and if so, the method ends, as indicated by step 742. If the processList is not empty, control passes to step 706. In step 706, the first process step is retrieved from the processList.

Next, in step 710, the SYNC method 512 determines whether the SubLine has changed, and if so, calls the NOTICE method 508, to force the workflow management system to notice the change to the SubLine. Control then passes to step 712. In step 712, the method determines if the process step is of the type 'automatic' 414. If it is, control passes to step 714, where the automatic process step is automatically executed by the workflow management system. After the function associated with the automatic step has been executed in step 714, the SYNC function calls the NOTICE method 508, so that the appropriate process steps are evaluated in response to the automatically executed function. Control then passes to step 716.

If step 712 determines that the process step is not an automatic step, control passes to step 726. In step 726, the SYNC method 512 calculates the status 416 of the process step. This is preferably accomplished by examining the tests 412 associated with the process step. For a normal step 414, the SYNC method will examine the skip tests 422, to determine if the step should be skipped. If the process step is not skipped then the completion tests 422 are examined. If all the completion tests pass, this indicates that the process step is now complete and the status 416 changes from incomplete to complete. If any of the completion tests are FALSE, the process step is not complete and the status 416 remains unchanged and incomplete.

If the process step is of the type exception 414, the completion and skip tests 422 are the same. Accordingly, the rules 412 associated with an exception step are both the skip and completion rules. Thus, for exception steps, if at least one of the rules fail, an exception is indicated and the status 416 for the step is incomplete. This will prompt attention from a user, that action is required to complete the process step. Once the user performs the required action, these tests will be executed again. If at that time, all of the tests pass, the step will be tagged with a complete status. If all of the tests for an exception step pass the first time through, there is no exception and the rule is skipped. The status 416 for a skipped exception rule is non-applicable (N/A).

After the status of the process step is calculated in step 726, control passes to step 730. In step 730, the SYNC method 512 determines if the new status is different from the previous status (i.e. if the status has changed). If so, the process step is stamped with the new status 416 as indicated by step 732. Next, in step 734, the SYNC method determines if the new status is a complete status 416. If so, control passes to step 738.

In step 738 another method referred to herein as INITIALIZE is called. The INITIALIZE method 738 essentially finds the next process step in the workflow and activates that step. The INITIALIZE method 738 is described in detail below. After calling the INITIALIZE method, control passes to step 740, where the NOTICE method 508 is called in response to the status update of the process step.

If the status has not changed according to step 730, control passes to step 716. Control also passes to step 716 after step 728 as described above. In step 716, the SYNC method 512 determines if the process step is 'collateral specific' 420. If the process step is 'collateral specific' 420 the method loops back to step 712 and repeats the above method steps for each additional item of collateral listed in the credit application. Collateral specific 420 process steps are steps that need to be performed one time for each item of collateral listed in the credit application. Accordingly, if the current step is collateral specific, control passes back to step 712, and the method steps are repeated for each item of collateral. If the process step is not collateral specific, or if the above method steps have been repeated for all associated items of collateral, control passes to step 718.

In step 718, the SYNC method 512 determines if there are additional process steps to processed in the processList. If so, control passes back to step 706, and the method repeats the above described method steps for the next process step. If all process steps in the processList have been processed by the SYNC method 512, control passes to step 720. In step 720, the method determines if there are any process steps remaining in the workflow that have a status 416 of 'incomplete.' If so, control passes to step 722, where the SYNC method 512 finds the next set of steps having an incomplete status which are to become the next active steps in the workflow. This is accomplished with the use of the 'follow step' indicator 420, as described above, for each of the completed steps. If there are no steps with a status of incomplete, the application is complete as indicated in step 724. The SYNC method 512 ends with step 742.

Figure 8:
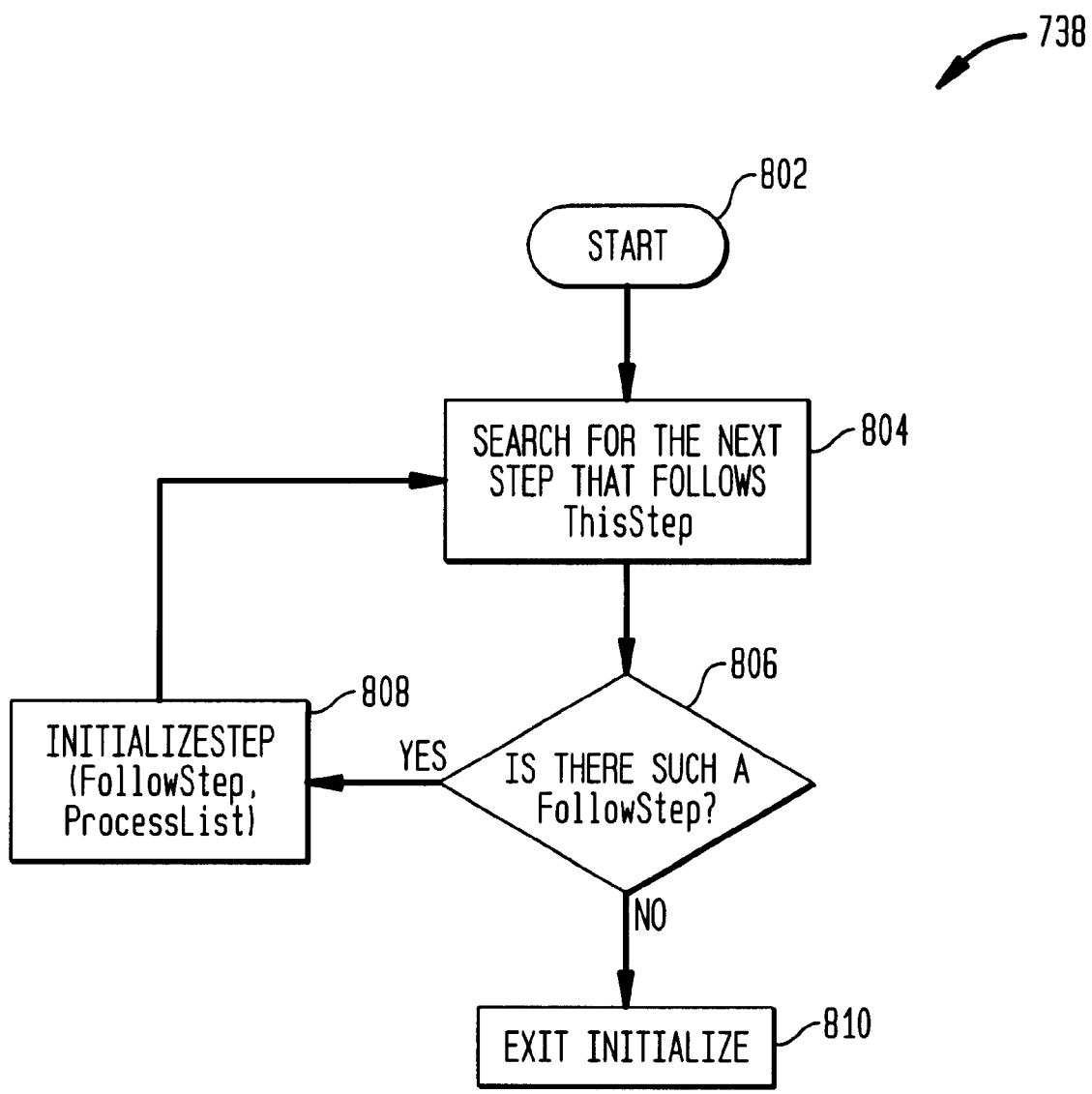

FIG. 8 is an example method that can be used as the INITIALIZE method according to a preferred embodiment of the present invention. The INITIALIZE method 738 essentially builds the workflow by activating process steps that depend from a process step whose status just changed to complete ('the completed step'), according to step 734 in the SYNC method 512.

The INITIALIZE method 738 begins with step 802, where control immediately passes to step 804. In step 804 the method finds the next process step that follows the completed step. If there is such a step as determined in step 806, control passes to step 808. In step 808, the next process step is initialized by calling another method referred to herein as INITIALIZESTEP. A method that can be used for the INITIALIZESTEP 808 is described below. After INITIALIZESTEP is called control passes back to step 804, where the method is completed until there are no remaining steps that follow the current process step. Control then passes to step 810, where the INITIALIZE method 738 ends.

Figure 9:
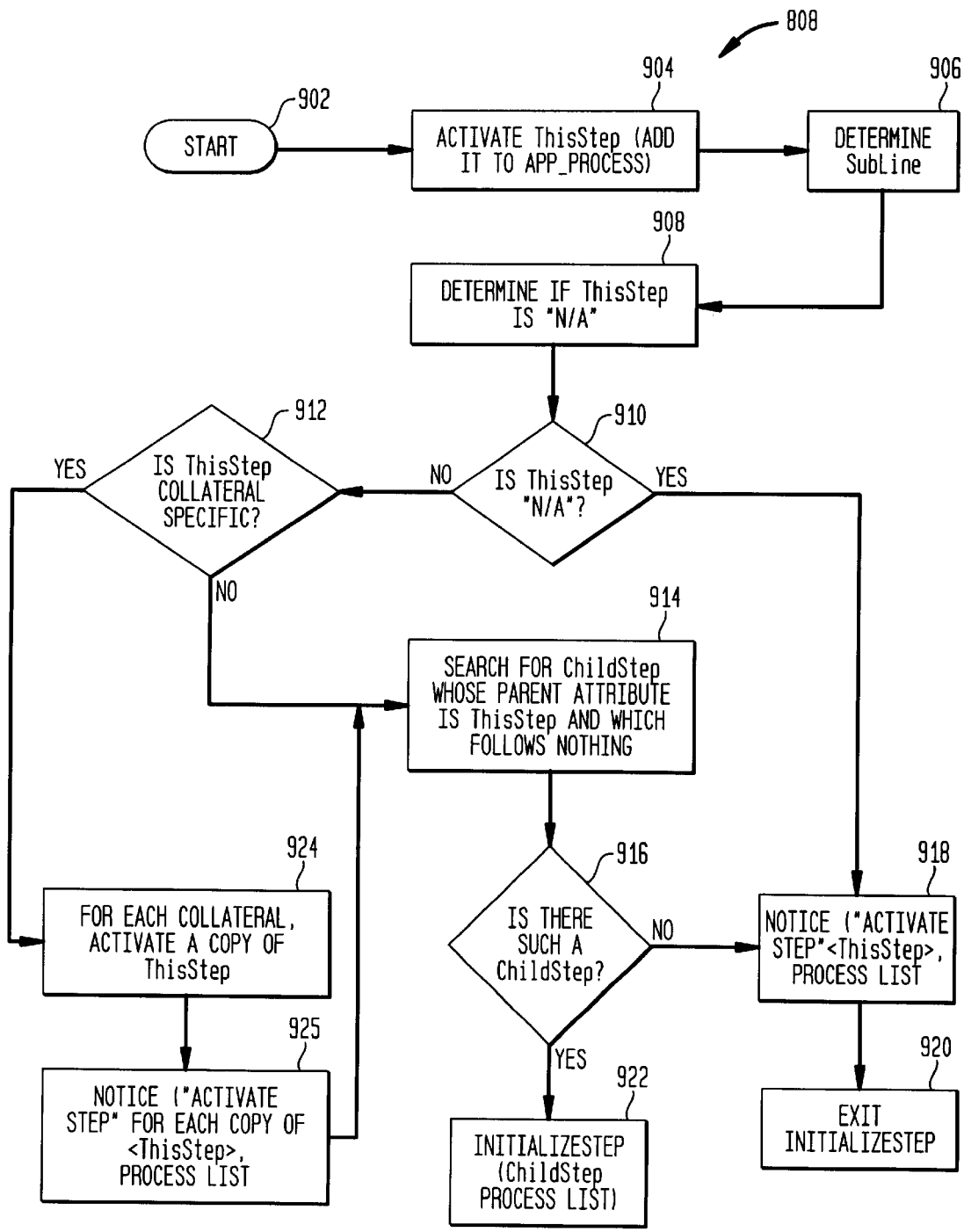

FIG. 9 is an example method that can be used as the INITIALIZESTEP method according to a preferred embodiment of the present invention. In INITIALIZESTEP, one or more process steps are activated and become part of the processList. The INITIALIZESTEP method 808 begins with step 902, where control immediately passes to step 904. In step 904 the method activates the process step passed into the method, referred to as 'ThisStep'. It should be recalled that 'ThisStep' was determined to be the step that follows the completed step from the INITIALIZE method 738, as determined in step 808 of that method.

As stated, a step is active when it becomes part of the current workflow and is ready to be processed. Active steps are steps whose predecessor steps have been completed. Next in step 906, the INITIALIZESTEP method determines the SubLine of the process step. This is done in order to determine if the process step has as status 416 of N/A and should therefore be skipped. This is accomplished by evaluating the skip rules 422 associated with the process step. If the process step is to be skipped, there is no need to activate the child steps associated of the process step. Accordingly, as step 910 indicates, if the process step has a status of N/A, control passes to step 918, where the NOTICE method 508 is called so that the workflow management system knows to evaluate the status of the step. The method then ends as indicated by step 920.

If the process step does not have a status 416 of 'N/A', control passes to step 912. In step 912, the INITIALIZESTEP method 808 determines whether the process step is 'collateral specific' 420. If it is, control passes to step 924, where a separate copy of the process step is activated for each collateral item in the credit application. Control then passes to step 925 where the NOTICE method 508 is called so that the steps just activated are noticed by the workflow management system. Control then passes to step 914.

If step 912 determines that the process step is not collateral specific, control passes to step 914. In step 914, the method searches for a child step whose parent is 'ThisStep' and does not follow another step. That is, the method looks for a child step that does not depend on another step being completed. If such a step is found, this process INITIALIZESTEP is recursively called for the child step. If there is no such child step, control passes to step 918 where the child step is noticed by the workflow management system and method ends, as indicated by step 920.

Figure 10:
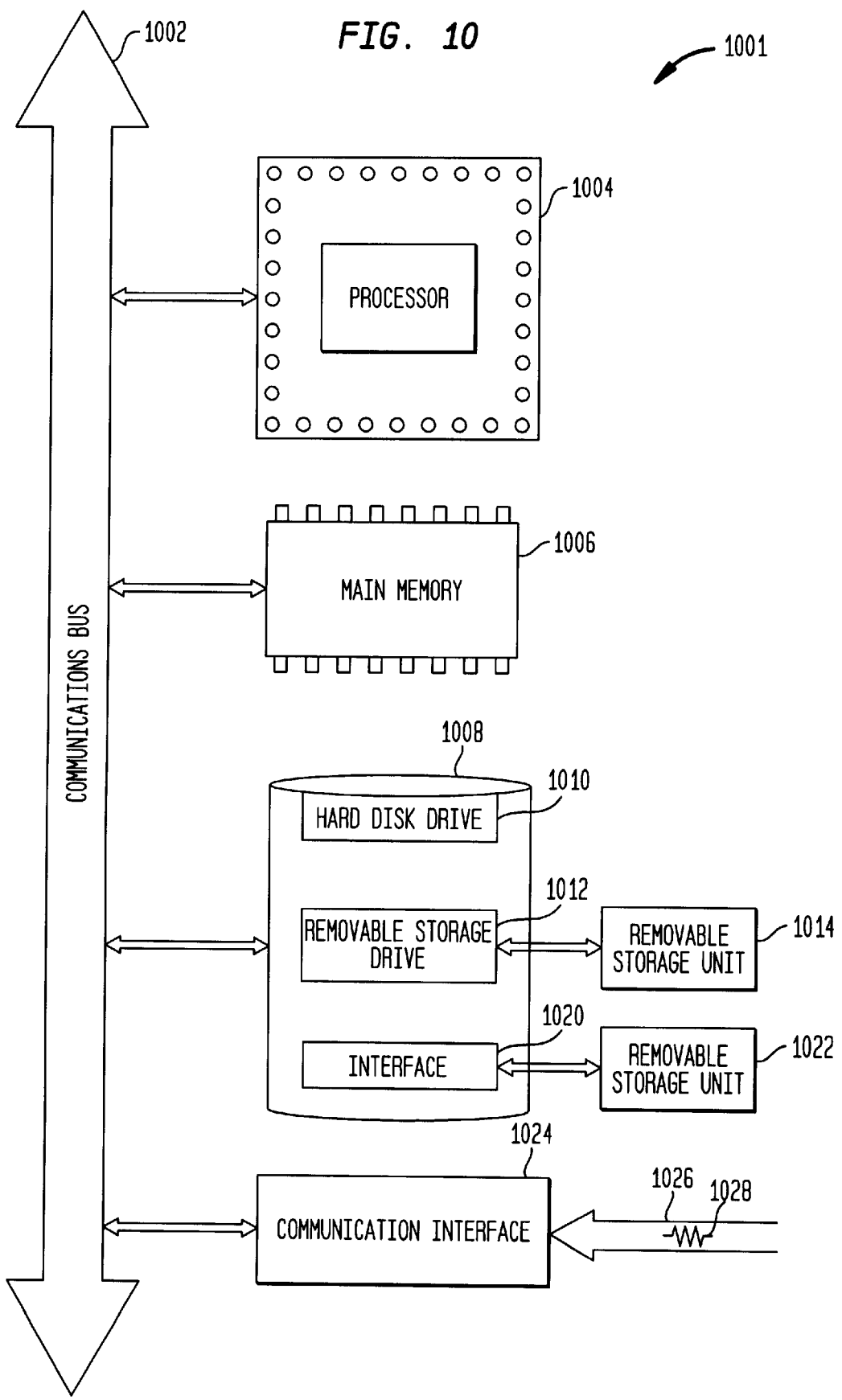
FIG. 10 is a block diagram of a computer useful for implementing components of the present invention.

The present invention may be implemented using hardware, software or a combination thereof and may be implemented in a computer system or other processing system. In fact, in one embodiment, the invention is directed toward a computer system capable of carrying out the functionality described herein. An example computer system 1001 is shown in FIG. 10. The computer system 1001 includes one or more processors, such as processor 1004. The processor 1004 is connected to a communication bus 1002. Various software embodiments are described in terms of this example computer system. After reading this description, it will become apparent to a person skilled in the relevant art how to implement the invention using other computer systems and/or computer architectures.

Computer system 1002 also includes a main memory 1006, preferably random access memory (RAM), and can also include a secondary memory 1008. The secondary memory 1008 can include, for example, a hard disk drive 1010 and/or a removable storage drive 1012, representing a floppy disk drive, a magnetic tape drive, an optical disk drive, etc. The removable storage drive 1012 reads from and/or writes to a removable storage unit 1014 in a well known manner. Removable storage unit 1014, represents a floppy disk, magnetic tape, optical disk, etc. which is read by and written to by removable storage drive 1012. As will be appreciated, the removable storage unit 1014 includes a computer usable storage medium having stored therein computer software and/or data.

In alternative embodiments, secondary memory 1008 may include other similar means for allowing computer programs or other instructions to be loaded into computer system 1001. Such means can include, for example, a removable storage unit 1022 and an interface 1020. Examples of such can include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1001.

Computer system 1001 can also include a communications interface 1024. Communications interface 1024 allows software and data to be transferred between computer system 1001 and external devices. Examples of communications interface 1024 can include a modem, a network interface (such as an Ethernet card), a communications port, a PCMCIA slot and card, etc. Software and data transferred via communications interface 1024 are in the form of signals which can be electronic, electromagnetic, optical or other signals capable of being received by communications interface 1024. These signals 1026 are provided to communications interface via a channel 1028. This channel 1028 carries signals 1026 and can be implemented using wire or cable, fiber optics, a phone line, a cellular phone link, an RF link and other communications channels.

In this document, the terms "computer program medium" and "computer usable medium" are used to generally refer to media such as removable storage device 1012, a hard disk installed in hard disk drive 1010, and signals 1026. These computer program products are means for providing software to computer system 1001.

Computer programs (also called computer control logic) are stored in main memory and/or secondary memory 1008. Computer programs can also be received via communications interface 1024. Such computer programs, when executed, enable the computer system 1001 to perform the features of the present invention as discussed herein. In particular, the computer programs, when executed, enable the processor 1004 to perform the features of the present invention. Accordingly, such computer programs represent controllers of the computer system 1001.

In an embodiment where the invention is implemented using software, the software may be stored in a computer program product and loaded into computer system 1001 using removable storage drive 1012, hard drive 1010 or communications interface 1024. The control logic (software), when executed by the processor 1004, causes the processor 1004 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for dynamically managing workflow for an automated credit application system in response to functions executed by a user or by the automated credit application system, comprising the steps of:

configuring a workflow for a credit application, comprising the steps of:

defining a plurality of workflow process steps, each said workflow process steps having an associated status, wherein said status can be complete or incomplete;

associating one or more tests with each of said workflow process steps;

relating one or more database elements with each of said tests; and linking one or more functions with each of said database elements; and processing a workflow for the credit application, comprising the steps of:

identifying an executed function, wherein said executed function can be executed by the user or by the automated credit application system;

finding a set of potentially affected workflow process steps comprising all workflow process steps associated with said executed function;

calculating the status of each workflow process step in said set of potentially affected workflow process steps;

dynamically determining, in response to said identifying step, said finding step and said calculating step, a next step for each said workflow process step in said set of potentially affected workflow process steps, in which said status changes from incomplete to complete according to said calculating step; and associating a level of security with each of said functions and the user and wherein a particular function can only be executed by the user if the user is associated with the same or higher level of security as said particular function.

2. The method of claim 1, wherein said configuring step further comprises the step of creating a function list associated with each said workflow process steps, each said function list comprising a list of functions associated with the corresponding workflow process step, wherein said function list is created by examining relationships between said workflow process steps, said tests, said database elements and said functions, according to relationships established by said associating, relating and linking steps.

3. The method of claim 2, wherein said processing step further comprises the step of:

creating a process list comprising a list of workflow process steps that are currently active; and said finding step is accomplished by evaluating each said function list associated with each said workflow processing step that is currently active according to said process list.

4. The method of claim 2, wherein said finding step is accomplished by evaluating each said function list associated with each said workflow processing step.

5. The method of claim 1, wherein said finding step is accomplished by examining relationships between said workflow process steps, said tests, said database elements and said functions, according to relationships established by said associating, relating and linking steps.

6. The method of claim 1, wherein said processing step further comprises the step of creating a process list comprising a list of workflow process steps that are currently active.

7. The method of claim 1, wherein said processing step further comprises the step of:

creating a process list comprising a list of workflow process steps that are currently active; and said finding step is accomplished by examining relationships between said currently active workflow process steps, said tests, said database elements and said functions, according to relationships established by said associating, relating and linking steps.

8. The method of claim 1, wherein said calculating step comprises the step of evaluating said at least one said tests associated with each of said workflow process steps in said set of potentially affected workflow process steps.

9. The method of claim 1, wherein said associating step comprises the step of associating one or more rule elements to one or more of said database elements, wherein each of said rule elements is associated with one or more of said tests.

10. A system to dynamically manage workflow for an automated credit application system in response to functions executed by a user or by the automated credit application system, comprising:

a function module comprising a plurality of functions, each of said functions can be executed by the user or by the automated credit application system;

a test module comprising a plurality of tests, each of said tests associated with at least one of said functions;

a data module comprising a plurality of workflow process steps for an credit application, each of said workflow process steps associated with at least one of said tests;

a notice module responsive to an executed function in said function module, wherein said notice module is used to identify which said workflow process steps for the credit application are associated with said executed function; and a security feature coupled with said function module, wherein each of said functions and the user are associated with a level of security and wherein a particular function can only be executed by the user if the user is associated with the same or higher level of security as said particular function.

11. The system of claim 10, further comprising:

a database element module, comprising a plurality of database elements, each of said database elements associated with at least one of said functions; and a rules module comprising a plurality of rule elements, each of said rule elements associated with one or more of said database elements, and each of said rule elements associated with one or more of said tests.

12. The system of claim 10, wherein said test module comprises completion tests, skip tests and exception tests.

13. The system of claim 10, wherein said workflow process steps include an associated status, wherein said associated status can be incomplete, non-applicable, complete or waived.

14. The system of claim 10, wherein said plurality of workflow process steps are organized in specified order.

15. The system of claim 10, wherein said plurality of workflow process steps are organized in a hierarchy, wherein each said workflow process step can have a parent and a child.

16. The system of claim 10, further comprising:

a calculate status module for calculating the status of each of said workflow process steps associated with said executed function; and a dynamic module, responsive to said calculate status module, for dynamically determining the next process step of said workflow process steps to be executed.

17. A computer program product comprising a computer useable medium having computer program logic stored therein, said computer program logic for dynamically managing workflow for an automated credit application system in response to functions executed by a user or by the automated credit application system, wherein said computer program logic comprises:

configuring means for enabling the computer to configure a workflow for a credit application, comprising:

defining means for enabling the computer to accept from a user a definition for a plurality of workflow process steps, each said workflow process steps having an associated status, wherein said status can be complete or incomplete;

associating means for enabling the computer to associate one or more tests with each of said workflow process steps;

relating means for enabling the computer to relate one or more database elements with each of said tests; and linking means for enabling the computer to link one or more functions with each of said database elements; and processing means for enabling the computer to process a workflow for the credit application, comprising:

identifying means for enabling the computer to identify an executed function, wherein said executed function can be executed by the user or by the automated credit application system;

finding means for enabling the computer to find a set of potentially affected workflow process steps comprising all workflow process steps associated with said executed function;

calculating means for enabling the computer to calculate the status of each workflow process step in said set of potentially affected workflow process steps;

dynamic determining means, responsive to said identifying means, said finding means and said calculating means, for enabling the computer to determine a next step for each said workflow process step in said set of potentially affected workflow process steps, in which said status changes from incomplete to complete according to said calculating means; and security means for associating a level of security with each of said functions and the user and wherein a particular function can only be executed by the user if the user is associated with the same or higher level of security as said particular function.

18. The computer program product of claim 17, wherein said configuring means further comprises means for enabling the computer to create a function list associated with each said workflow process steps, each said function list comprising a list of functions associated with the corresponding workflow process step, wherein said function list is created by examining relationships between said workflow process steps, said tests, said database elements and said functions, according to relationships established by said associating, relating and linking means.

19. The computer program product of claim 18, wherein said processing means further comprises:

means for enabling the computer to create a process list comprising a list of workflow process steps that are currently active; and said finding means is accomplished by evaluating each said function list associated with each said workflow processing step that is currently active according to said process list.

20. The computer program product of claim 18, wherein said finding means is accomplished by evaluating each said function list associated with each said workflow processing step.

21. The computer program product of claim 17, wherein said finding means is accomplished by examining relationships between said workflow process steps, said tests, said database elements and said functions, according to relationships established by said associating, relating and linking means.

22. The computer program product of claim 17, wherein said processing means further comprises means for enabling the computer to create a process list comprising a list of workflow process steps that are currently active.

23. The computer program product of claim 17, wherein said processing means further comprises:

means for enabling the computer to create a process list comprising a list of workflow process steps that are currently active; and said finding means is accomplished by examining relationships between said currently active workflow process steps, said tests, said database elements and said functions, according to relationships established by said associating, relating and linking means.

24. The computer program product of claim 17, wherein said calculating means comprises means for enabling the computer to evaluate said at least one of said tests associated with each of said workflow process steps in said set of potentially affected workflow process steps.

25. A method for dynamically managing one or more workflow process steps for an automated credit application system in response to functions executed by a user or by the automated credit application system, comprising the steps of:

linking at least one rule test with each of the workflow process steps for a credit application;

linking at least one rule element with each of said rule tests;

linking each of said rule tests with at least one database element;

linking each of said database elements to at least one of the functions;

executing, by the user or by the automated credit application system, one of the functions, wherein the executed function alters said database elements, determining which of the workflow process steps for the credit application is next activated; and associating a level of security with each of said functions and the user and wherein a particular function can only be executed by the user if the user is associated with the same or higher level of security as said particular function.

* * * * *